May 19, 1970     S. G. GORDON ET AL     3,512,259

DENTAL MOUTH EXAMINING MIRROR

Filed Sept. 19, 1967

*INVENTORS*
SYDNEY G. GORDON
RICHARD E. PLOWMAN

BY

*ATTORNEY*

United States Patent Office 3,512,259
Patented May 19, 1970

3,512,259
DENTAL MOUTH EXAMINING MIRROR
Sydney G. Gordon, and Richard E. Plowman, York, Pa., assignors to Dentsply International Inc., York, Pa., a corporation of Delaware
Filed Sept. 19, 1967, Ser. No. 668,768
Int. Cl. A01c 3/00
U.S. Cl. 32—69                                          3 Claims

ABSTRACT OF THE DISCLOSURE

A dental mouth examining mirror of inexpensive construction rendering it capable of being expended after use on individual patients, if desired, and molded from synthetic resin to form an integral mirror member and supporting stem detachably connectable to a handle, the first surface of the mirror member being formed mirror-smooth and coated with a very thin layer of reflective metal such as aluminum, preferably applied by vapor deposition, to render the same highly reflective, the synthetic resin affording low thermal conductivity to minimize fogging of the reflective surface upon introduction into the oral cavity.

BACKGROUND OF THE INVENTION

For many years, it has been customary to form dental mirrors from metal comprising a handle connected at one end to a shallow cup member within which a circular glass mirror is secured by crimping the perimeter of the shallow cup walls into securing engagement with the periphery of the mirror. Dental mirrors of this type, in addition to being somewhat costly, possess a number of detrimental features. The more important of such derimental features are (1) susceptibility to fogging upon introduction into the oral cavity due to the high coefficient of thermal conductivity possessed by metal and glass, (2) refraction in the image reflected by the mirror due to the reflective backing on the glass mirror being on the so-called second surface which is positioned in the bottom of a shallow recess of the metal support therefor rather than upon the so-called first surface, (3) the susceptibility to crevices existing between the walls of the shallow cup member and the mirror within which mouth fluids, barteria, and the like, can accumulate and may not be destroyed if sterilization is not completely achieved after use upon a patient and before use upon another patient, (4) the appreciable thickness of the composite type of mirror comprising the shallow cup and the glass mirror mounted therein which tends to offer a certain amount of obstruction when viewing surfaces on the interior of the oral cavity, and (5) the occurrence of distracting noises, such as the clicking of metal against human teeth and other instruments being used in the oral cavity, thereby increasing the inherent traumatic anxiety to the normally apprehensive patient while experiencing dental operations of various kinds.

Though numerous improvements have been made over the years in the construction of dental mirrors, most of these have been concerned with the method of mounting glass mirrors within the shallow cup-like supporting members provided therefor, and changing the shapes of the handles and shanks thereof adjacent the mirror member in order to suit the desires of certain dentists and dental hygienists for certain operations in which the mirrors are employed. Also, many improvements have been directed to the provision of means to flush the reflective surface of dental mirrors clean, such as by the use of an air blast to remove therefrom the accumulation of water inherent to modern high speed dental operations which usually are accompanied by water sprays of appreciable magnitude.

Particularly because of the cost of conventional types of dental mouth examining mirrors, it is common practice to sterilize the same after use upon each individual patient. This usually is done by means of an autoclave in which steam is utilized to generate temperatures of a desired range which are sustained for a required number of minutes considered adequate to render the mirror sterile and ready for use upon additional patients. So-called cold sterilizing also is popular, employing suitable germicides, etc. These operations necessitate the exercise of care in order to prevent the possibility of cross-contamination between successive patients, for example. In view of the fact that it is customary for dentists and dental hygienists, as well as physicians, to almost constantly employ mirrors in normal procedures, it can be seen that in the course of a few hours a dentist or physician will use a substantial number of mirrors individually upon different patients, thereby requiring a substantial inventory of mirrors and necessitating corresponding extensive sterilizing operations to render all of the same sterile and ready for reuse.

SUMMARY OF THE INVENTION

It is the principal object of the present invention to provide a dental mouth examining mirror comprising a mirror member having a reflective so-called first surface and a supporting stem connected thereto and projecting from one edge thereof, at least said mirror member being formed from synthetic resin which has a substantially lower coefficient of thermal conductivity than metal and/or glass and permits the mirror to be positioned within the oral cavity without any substantial fogging of the mirror surfaces occurring as is commonly the result of introducing into the oral cavity a conventional metallic dental mirror which normally uses a glass reflective element supported thereon, such principles also being applicable to mirrors used by physicians for various kinds of medical observations.

A further object of the invention is to provide on said reflective first surface of the synthetic resin mirror member a very thin metal coating which provides the actual reflective surface for the mirror member and thereby eliminates the occurrence of ghost images as is a common experience when using conventional dental mirrors having glass mirror elements on which the reflective coating is applied to the so-called second surface of the glass member which is innermost within a shallow cavity in the mirror member.

A further object of the invention is to provide a substantially thinner mirror member by forming the same from synthetic resin and applying said aforementioned thin metal reflective coating to the said mirror-smooth reflective surface of maximum area and the thinness of said reflective coating substantially to the entire peripheral edge of the mirror member so as to provide a relative surface of maximum area and the thinness of the mirror member minimizes obstruction of view with said mirror when disposed in the oral cavity or in other localities in the human anatomy such as when used by physicians.

Still another object of the invention is to extend the thin metal coating, which primarily comprises the reflective surface, over all other surfaces of the mirror member and preferably etch or otherwise form said other surfaces, prior to applying the metal coating thereon, so as to produce a satin-like finish for the metal coating applied to said other surfaces of the mirror member and thus minimize the occurrence of distracting reflections.

A still further object of the invention is to form said thin metal coating upon said various surfaces of the mirror member described above by a vapor-deposition process which is relatively inexpensive and, in conjunction with forming said synthetic resin mirror member by a molding process, which is equally inexpensive, results in the production of a completed dental mouth examining mirror which is sufficiently inexpensive that it readily may be expended after use upon each individual patient and thereby minimize the possibility of cross-infection between successive patients.

One additional object of the invention resulting from the formation of the dental mirror from synthetic resin is to provide a dental mouth examining mirror of substantially less weight than conventional metal mirrors having glass reflective elements mounted thereon and, further, the unitary structure of the synthetic resin mirror and metal coating thereon renders the same highly resistant to environmental atmospheres and enhances the sterilization thereof in the event use of the mirror on successive patients is desired.

One further object of the invention is to protect the thin metal coating applied particularly to the reflective metal-coated first surface of the mirror with a transparent coating of suitable material and preferably of greater resistance to scratching than the metal coating.

Details of the foregoing objects and of the invention, as well as other objects thereof, are set forth in the following specification and illustrated in the accompanying drawing comprising a part thereof.

DESCRIPTION OF THE PREFERRED EMBODIMENTS

Figure 1:
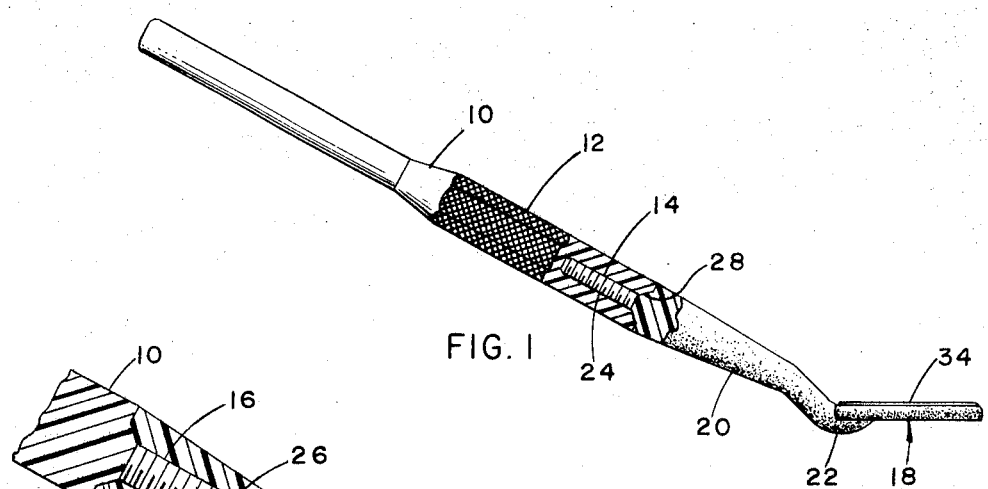
FIG. 1 is a side elevation of an exemplary dental mirror made in accordance with the principles of the present invention and the same being partially sectioned longitudinally to illustrate certain details of one embodiment of connecting means thereof.

In order to minimize the expense of manufacturing a dental mirror embodying the principles of the present invention, it is contemplated that the mirror shall comprise a handle 10 which may be formed for example, from metal or rigid synthetic resin of appropriate composition and capable of retaining its form even when subjected to either cold sterilization or autoclaving in a steam atmosphere. The handle, in accordance with conventional practice, preferably is provided with a knurled gripping surface 12 and one end of the handle is provided with connecting means which may be of several types. In FIG. 1, the connecting means in the handle 10 comprises a threaded socket 14, whereas in the additional embodiment shown fragmentarily in FIG. 2, the connecting means on the handle 10 comprises a threaded stem 16. Other types of suitable connecting means may be used, such as interfitting friction members, bayonet connecting means, and the like.

The preferred construction of the mirror portion of the invention comprises a relatively thin, wafer-like mirror member 18. Preferably formed integrally with the mirror member 18 is a supporting stem 20 which extends substantially radially from the mirror member 18 and at an obtuse angle to the plane of the mirror member as is shown in FIG. 1. Further, the portion of the stem 20 which is connected directly to the mirror member is enlarged at 22 to form a connection readily capable of withstanding appreciable stresses exerted against the mirror member without fracturing the connection thereof with the supporting stem 20.

The outer end of the supporting stem 20 is also provided with an appropriate type of connecting means complementary to the connecting means engageable therewith on said aforementioned one end of handle 10. In the embodiment shown in FIG. 1, the connecting means on stem 20 is specifically illustrated as comprising a threaded stem 24 which is snugly complementary to and preferably somewhat frictionally engageable with the internal threads of the socket 14 so as to prevent separative movement between the handle and stem from occurring readily. As indicated above, however, other equivalent types of connecting means may be employed.

Figure 2:
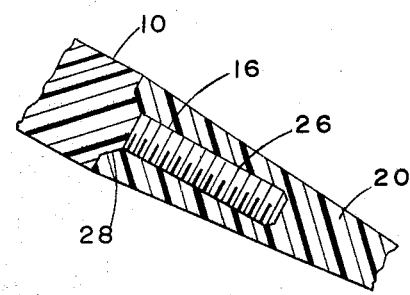
FIG. 2 is an enlarged fragmentary sectional view of a different embodiment of connecting means between the handle and stem of the mirror member from that illustrated in FIG. 1.
Figure 3:
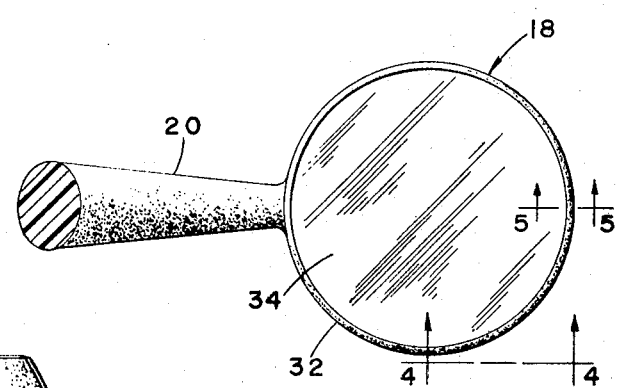
FIG. 3 is an enlarged plan view of the mirror member of the dental mirror shown in FIG. 1 and also illustrating a fragmentary portion of a supporting stem projecting radially from one edge of the mirror member.

In the embodiment shown in FIG. 2, the connecting means on stem 20, which is complementary to threaded stem 16 on handle 10, comprises an internally threaded socket 26 which is snugly and preferably frictionally engageable with the threaded stem 16 on the handle 10 for the same purposes as the snug fit between the connecting means and the embodiment shown in FIG. 1. In both of the specific embodiments described above, it is preferred that the end of the threaded stems connected either to the handle 10 or the stem 20 employ a circular fillet portion 28 which engages a complementary surface on the member threadably connected thereto in order to minimize the entry of either contaminating fluids or bacteria between the threads of the connected members.

One of the principal objects of the invention is to form the mirror member 18 and its preferably integral supporting stem 20 from suitable synthetic resin, such as by injection molding, the shape of the mirror and supporting stem being such as readily to enable a number of such structures to be molded simultaneously, such as in a multi-cavity mold. Such arrangement also facilitates the handling of the mirror and stem members in the subsequent coating operations described hereinafter.

Among the materials which are suitable for forming such integral mirror members 18 and stems 20 are many of the polycarbonates, fluorocarbonates, acrylics, acrylonitriles, phenoxies and ABS (acrylonitriles-butadiene-styrene) or any other materials suitable for molding. A substantial number of these materials are capable of forming molded products which are rigid and possess relatively hard outer surfaces highly suitable for the formation of mirror-smooth reflective surfaces 30 on the upper surface of mirror member 18, as viewed in FIGS. 1, 4 and 5. Such surface 30 is known in the dental profession as the first surface. The surfaces of the mold cavities which form the other surfaces and portions of the mirror member, such as the so-called second surface, which is opposite the first surface, and the stem may be suitably etched or otherwise scored such as by sand blasting, in order to form a preferably satin-like surface upon such other surfaces of the molded mirror members 18 and stems 20 so as to minimize the occurrence of distracting reflections in use.

Figure 4:
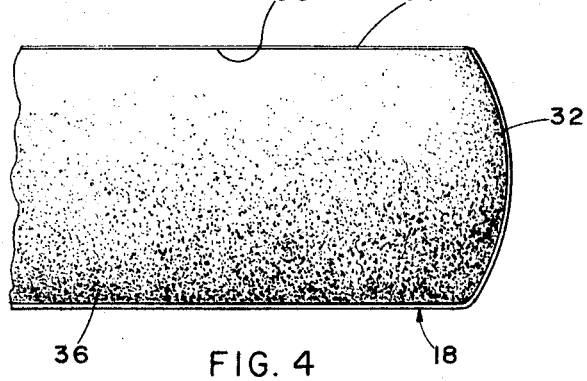
FIG. 4 is a further enlarged fragmentary edge view of a portion of the mirror member per se shown in FIGS. 1 and 3 as seen on the line 4—4 of FIG. 3.
Figure 5:
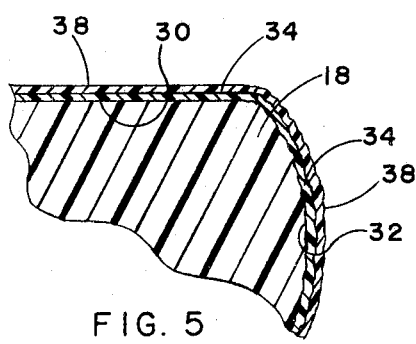
FIG. 5 is a fragmentary sectional elevation particularly of the edge portion of the mirror member as seen on the line 5—5 of FIG. 3.

The perimeter 32 of the mirror member 18, in side elevation or cross-sectional view, shown in FIGS. 4 and 5, is slightly curved so as to bulge outwardly a limited amount without appreciably detracting from the desired maximum amount of area for the outer mirror-reflective surface 30 which comprises the reflective first surface of the mirror member. Providing the maximum area for such reflective surface is desired and a shape such as that presently proposed for the perimeter 32 is capable of achieving such objective without producing any objectionable, substantially sharp peripheral edges which outline either the upper or lower surfaces of the mirror member 18. The radius of curvature of perimeter 32 of the mirror member preferably is greater than the thickness of said member.

The principal purpose of forming the mirror member 18, in particular, from synthetic resin is to provide the mirror with a substantially lower coefficient of thermal conductivity than conventional metal and/or glass which, for many years, have been the common materials used in making dental mouth examining and other types of medical examination mirrors. Because of the lower coefficient of thermal conductivity possessed by at least most of the synthetic resins referred to above, as compared with metal and/or glass, dental mirrors made therefrom have the very desirable characteristic of not fogging when inserted into the warm, moist oral cavity at body temperature, especially if the temperature of the dental operatory is 25 or 30° lower than body temperature, as is normal.

Particularly since the advent of the use of dental mouth examining mirrors, the aforementioned fogging characteristic has been present and has plagued dentists, hygientists and physicians to the extent that almost immediately after inserting a conventional dental mirror in the oral cavity, it must immediately be withdrawn and the fog formed thereon wiped from the mirror, sometimes two or three times, before the temperature of the mirror rises to suitably approach that of body temperature so that no further fogging occurs. When the mirror is placed upon the tray or cabinet after each use, it rapidly assumes room temperature, and upon reinsertion in the oral cavity when next needed, fogging again occurs.

A secondary beneficial result from utilizing synthetic resin to form the mirror member 18, in particular, is the lightness in weight, particularly if the handle 10 similarly is formed from synthetic resin as well as the stem 20 which is integral with the mirror member 18. Still further, another benefit arising from the use of synthetic resin for such purposes which also results from the integral nature of the mirror member 18, is that the thickness of the member 18 may be substantially less than the corresponding dimension of a conventional dental mirror made from metal and including a shallow recess within which a glass mirror element is inserted. Such thinner mirror member offers much less obstruction to viewing interior objects and surfaces in the oral cavity than a conventional mirror.

To provide a reflective first surface upon the mirror member 18, the mirror-smooth surface 30 thereon, in accordance with the invention, is covered with a preferably ultra-thin metallic coating 34 of a suitable metal, such as aluminum, tin or other appropriate metals which preferably are inexpensive and which are capable of firmly adhering to mirror-smooth surfaces of synthetic resin elements, preferably by using a vacuum deposition process. Further, the material cost of such metal coatings is insignificant, as compared with silver, rhodium and others which are suitable as to reflective properties but are too expensive to render the mirrors expendable as contemplated. Such vapor-deposition process also is very inexpensive.

Rather than have to mask the perimeter 32 and the second surface 36 which is opposite the reflective first surface 30 upon which the coating 34 is applied, when said metal coating 34 is vapor-deposited, for example, upon surface 30, all of said other surfaces of the mirror member 18 as well as the supporting stem 20 preferably simultaneously are also coated with the same metal and to the same thickness as applied to surface 30. Such other surfaces preferably, however, as mentioned above, are of an etched or stippled nature so that the metal coating applied thereupon is satin-like or minutely dimpled in order to minimize the occurence of undesired reflections when in use in the oral cavity or as otherwise intended. Further, by utilizing a continuous and uninterrupted metal coating, there is substantially no possibility of environmental atmospheres, bacteria, or otherwise accumulating thereon in locations to which access is difficult, such as now is possible in regard to the crevises surrounding a glass mirror when mounted within a shallow recess in the metal mirror element of a conventional dental mirror.

The application of the reflective metal coating 34 directly to the mirror-smooth first surface 30 of the mirror member 18 provides the extremely beneficial result of no refraction of reflected images or so-called ghost images being produced. This results in a far higher degree of accuracy in operational procedures by the dentist, dental hygienist or physician than if the reflective surface is substantially below the uppermost, first surface of the mirror member as is commonly the structure of conventional mirrors in which the glass mirror element has the reflecting coating applied to the second surface thereof adjacent the bottom of the supporting cavity therefor rather than to the first surface.

Still another benefit resulting from the employment of synthetic resin to form the mirror member 18, as well as the supporting stem 20, comprises the fact that when said mirror member or supporting stem inadvertently engages the teeth of a patient or another instrument within the oral cavity during operational procedures, no distracting or discomforting noises are produced such as the well-known clicking which patients find objectionable when metallic dental instruments strike each other within the oral cavity or click against the teeth of the patient. Although there is a certain amount of noise emanting from the contacting of teeth or metal instruments within the oral cavity by a dental mirror made from synthetic resin, in accordance with the principles of the invention, such noise is of a totally different type, of much less annoying level than that resulting from the clicking of metal against metal or metal against teeth and hence is far less objectionable to a patient than the latter.

Aside from all the other benefits referred to above, another paramount advantage of the present invention is the very inexpensive nature of a dental mirror embodying the principles of the invention which especially render the cost of the mirror member 18 and integral supporting stem 20 so slight that the same readily may be expended after the completion of use thereof within the oral cavity of an individual patient and thus eliminate any possibility of cross-infection between successive patients, particularly if the dental mirror happens to be subjected to sterilizing procedures which may not be completely effective, as sometimes occurs, and cross-infection results therefrom. In the event a patient is suffering from a known highly infective organism, the operator can dispose of the mirror at once, thereby insuring the elimination of any cross-contamination of succeeding patients.

While it is possible that even if the entire handle connected to the mirror member 18 were of an integral nature and formed from the same type of synthetic resin as the mirror member, the total cost thereof would not be increased very appreciably over that of the cost of the integral mirror members 18 and stem alone. Nevertheless, a slight saving in cost is achieved by making the handle 10 separate from the stem 20 in accordance with the present invention and this permits utilizing a satisfactory merchandising arrangement wherein, for example, a single handle and possibly ten or a dozen individually packaged and sterile combination mirror members 18 and their supporting stems 20 are sold in a suitable box or package for retail distribution to a dentist or physician.

Such aforementioned arrangement also results in the connecting member or means on the handle not becoming unduly worn simply from the interchange thereof with only ten or a dozen supporting stems on integral mirror members, thereby insuring firm, frictional contact between the handle 10 and the stem 20 of the mirror members 18 at all times and even after a number of interchanges between the handle and stem of such mirror members.

Certain types of suitable, reflective metal coating materials, such as aluminum or aluminum alloys, tin, and the like, which are highly suitable for vapor-deposition, nevertheless are of a relatively soft nature. To minimize the scratching of such surfaces in use and especially the reflective metal coating surface 34 upon the mirror-smooth first surface 30 of the mirror member 18, it is contemplated by the present invention that an appropriate protective covering comprising a thin, transparent coating 38 be deposited or otherwise applied preferably over the entire metal coating 34. In the event a hard reflective metal coating 34 is deposited on the mirror-smooth surface 30 of the mirror member 18, this additional procedure for protection against abrasion is not required.

There are available a number of transparent, so-called tough coatings and the like, which are non-toxic and of no objectionable taste, which may be utilized to form the coating 38. Appropriate solutions of hard quartz also are available for purposes of coating any such relatively soft metal coatings 34 and render the same resistant to abrasion or marring to a highly practical extent. Considering the fact however that if the mirror members and their connected stems are to be discarded after use on each individual patient, limited use of this type minimizes the possibility of such coated surfaces being subjected to abrasion.

Although the reflective surface 30 of the mirror member 18 and the metal coating 34 thereon are illustrated as being substantially flat, it is to be understood that this surface may be formed so as to be either concave or convex, if desired, in accordance with certain desired shapes for the reflective surfaces of mirrors for dental and other medical purposes. Such shapes automatically are formed incident to molding the mirror members and stems thereon from appropriate synthetic resin or other suitable materials. Except for the application of a metal coating to the mirror members 18 and stems 20, no further production or finishing operations are required.

While the invention has been described and illustrated in its several preferred embodiments, it should be understood that the invention is not to be limited to the precise details herein illustrated and described since the same may be carried out in other ways falling within the scope of the invention as shown and described.

We claim:
1. A dental mouth examining mirror comprising a mirror member provided with an operative reflective surface and a supporting stem connected to and projecting from one edge thereof, said mirror member and supporting stem being rigid and molded integrally from synthetic resin to provide an uninterrupted outer surface and said resin having a substantially lower coefficient of thermal conductivity than metal and/or glass and said mirror member being of minimal thickness in comparison with necessary strength and having a mirror-smooth first surface, a very thin coating of reflective metal covering all surfaces of said mirror member and extending to the entire periphery of the mirror-smooth surface and firmly adhering thereto, and a transparent protective coating and adhering to said metal coating, whereby said examining mirror is of minimum weight and affords maximum vision in use due to freedom from obstruction to view afforded by said thinness of said mirror, said mirror also causing substantially no trauma from temperature shock or fogging of said reflective surface of said mirror during normal use thereof as when initially introduced in an oral cavity.

2. The dental mouth examining mirror according to claim 1 in which the periphery of said mirror member is slightly rounded in transverse cross-section upon a radius of greater length than the thickness of said member to minimize discomfort when disposed within the oral cavity of a patient while affording maximum area for said mirror-smooth surface of the mirror member to which said reflective metal coating is affixed.

3. The dental mouth examining mirror according to claim 1 in which the periphery and reverse surface of said mirror member are satin-like to minimize undesired reflections in use.

References Cited

UNITED STATES PATENTS 2,625,858   1/1953   Dreher _____ 32—69 XR
3,300,859   1/1967   Sanden _____ 32—69

FOREIGN PATENTS 1,024,347   3/1966   Great Britain.

ROBERT PESHOCK, Primary Examiner

U.S. Cl. X.R.
350—288